J. T. CONDON & F. JEFFERS.
Hose-Coupling.

No. 134,195. Patented Dec. 24, 1872.

Witnesses:
John Becker.

Inventor:
J. T. Condon
F. Jeffers
per
Attorneys.

UNITED STATES PATENT OFFICE.

JOHN T. CONDON, OF NEW ORLEANS, LOUISIANA, AND FRANK JEFFERS, OF PAWTUCKET, RHODE ISLAND.

IMPROVEMENT IN HOSE-COUPLINGS.

Specification forming part of Letters Patent No. 134,195, dated December 24, 1872.

*To all whom it may concern:*

Be it known that we, JOHN T. CONDON, of New Orleans, in the parish of Orleans and State of Louisiana, and FRANK JEFFERS, of Pawtucket, in the county of Providence and State of Rhode Island, have invented a new and useful Improvement in Hose-Coupling, of which the following is a specification:

This invention relates to new and important improvements in the manner of coupling hose for fire-engines and other purposes; and it consists in the construction and arrangement of parts hereinafter more fully set forth and described.

Figure 1:
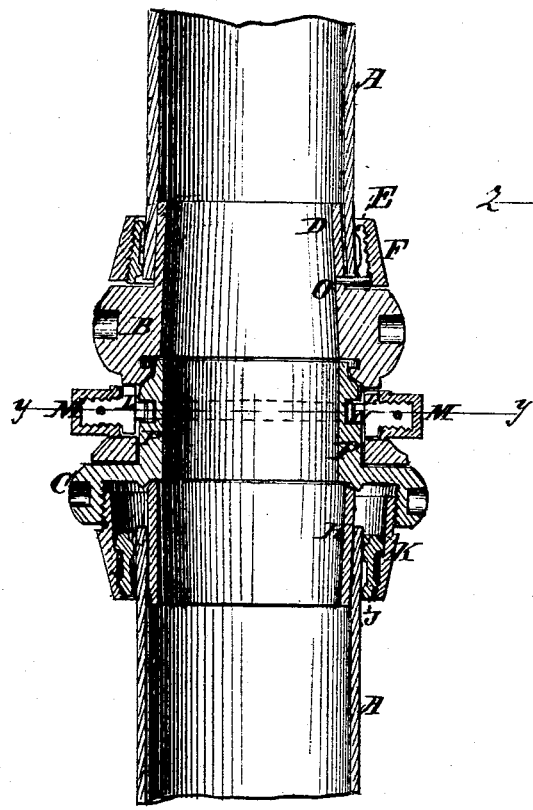
Figure 2:
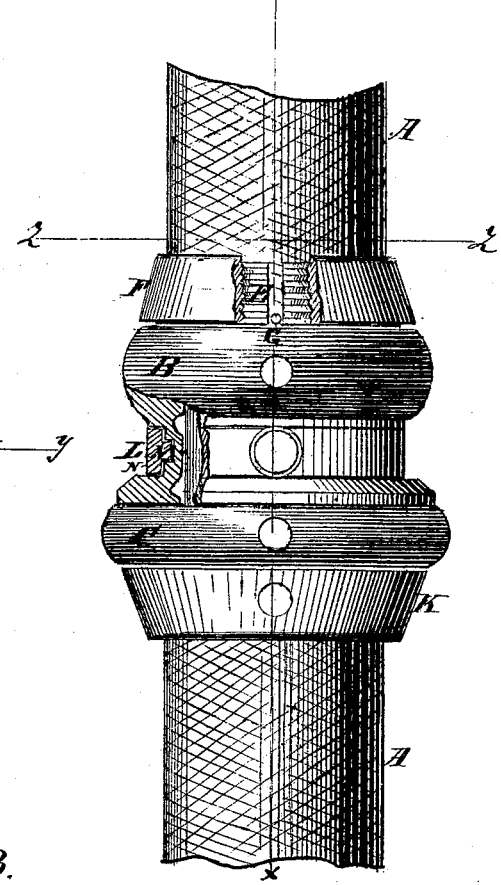
Figure 3:
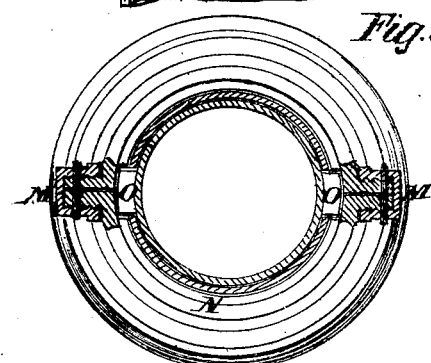
Figure 4:
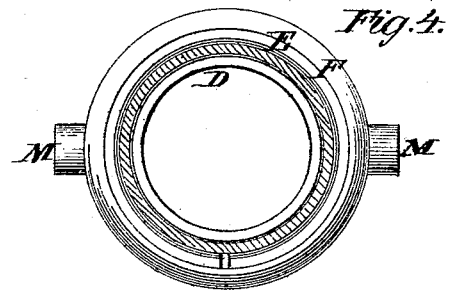

In the accompanying drawing, Figure 1 represents a longitudinal section of the coupling taken on the line $x$ $x$ of Fig. 2; Fig. 2 is an outside view, partly in section; Fig. 3 is a cross-section of Fig. 1 taken on the line $y$ $y$; and Fig. 4 is a cross-section of Fig. 2 taken on the line $z$ $z$.

Similar letters of reference indicate corresponding parts.

A represents the hose, made of the ordinary materials, and in the usual manner, and of any desired diameter. B and C are the main parts of the coupling to which the hose to be coupled is attached. The drawing represents two modes by which this is effected, differing slightly in the arrangement of parts, but essentially the same in results, as both are made to clasp a slightly-tapering tube and be compressed thereon in the same manner. D is an extension of the part B, and is the tube which receives the hose at one end and on which the hose is compressed by the cut ring E and band-nut F. The ring E by having a piece cut out, as seen in Fig. 2, is readily compressed on the tube D by the tapering nut F. The inner surface of this ring may be beaded, as seen in the drawing, or have lugs or projections upon it which will penetrate the hose, but that is not an essential feature, as it will securely hold the hose to the tube D if it is left smooth. G represents a pin which is inserted to prevent the ring from turning when the nut is screwed on. This connection is plainly shown in Fig. 1. The connection with the part C is essentially the same, although the tube H, upon which the hose is compressed, is separate from the coupling and inserted into the hose. This tube H is tapering, the same as the tube at the other end, and the hose is compressed upon it by means of the ring J, which is drawn up onto the hose by the band-nut K. This nut screws into the part C of the coupling and draws the ring by means of the shoulders on its inner surface and on the outer surface of the ring, as seen in the drawing. The inner surface of the ring J is formed with one or more projecting beads, the same as the cut ring at the other end of the coupling; but it may be made either with or without these beads. In practice we connect the hose to the coupling by either of these plans, and find either connection sufficient to stand any desired pressure of water, as they have been tested successfully under a pressure of three hundred pounds. The two parts B C are coupled together by means of the loose band L around the part B. This band is made in two parts or semicircles, connected and fastened together by the tubular caps $m$ $m$, which caps are shown in section in Fig. 3. On the inner surface of this band is a projecting rib or flange, N. O O are longitudinal slots in the part B which cuts through the groove which receives the rib N. The rib itself has openings at two points to correspond with these slots. The part C of the coupling enters the part B, as seen in Fig. 1, and has two slotted lugs, P P, upon its surface, which allow it to slip into B when the band is turned, so that the openings in the rib N correspond in position with the slots O O in B. The band is then turned in either direction; the rib N enters the slot of the lugs P P, and makes the coupling complete. The lugs P P and the slots therein, with the rib N engaged as when the hose is coupled, are plainly seen in Fig. 1. The coupling of the hose in this manner is but the work of a moment, and may be done in the dark as well as in the light. The parts are merely clapped together, and the band L is turned while the part C is pressed up to B. When the openings in the rib N correspond with the slots O the lugs P P enter, and then the band is turned, which completes the operation.

The ring J may be made smooth on the outside. The band-nut K will draw the ring J onto the hose just the same and hold it firm.

It will be seen that this coupling can be used for any thickness of hose merely by increasing or decreasing the thickness of the rings E and J. The same connections can be attached to the common screw-coupling at a trifling expense.

In connecting hose to other couplings the friction is so great as to cut and injure the material of which the hose is composed, while by connecting by this plan there is little or no friction on the material.

Having thus described our invention, we claim as new and desire to secure by Letters Patent—

A part coupling provided with extension D, a cut ring, E, and a band-nut, F, combined with a hose, A, as and for the purpose described.

JOHN THOS. CONDON.
FRANK JEFFERS.

Witnesses for J. T. CONDON:
 DAN HURLEY,
 WM. McC. JONES.

Witnesses for F. JEFFERS:
 ROYAL LEE,
 WM. A. CARPENTER.